INVENTORS
KENNETH S. KORDIK
ERNST W. SPANNHAKE
DEAN R. ZAUMSEIL

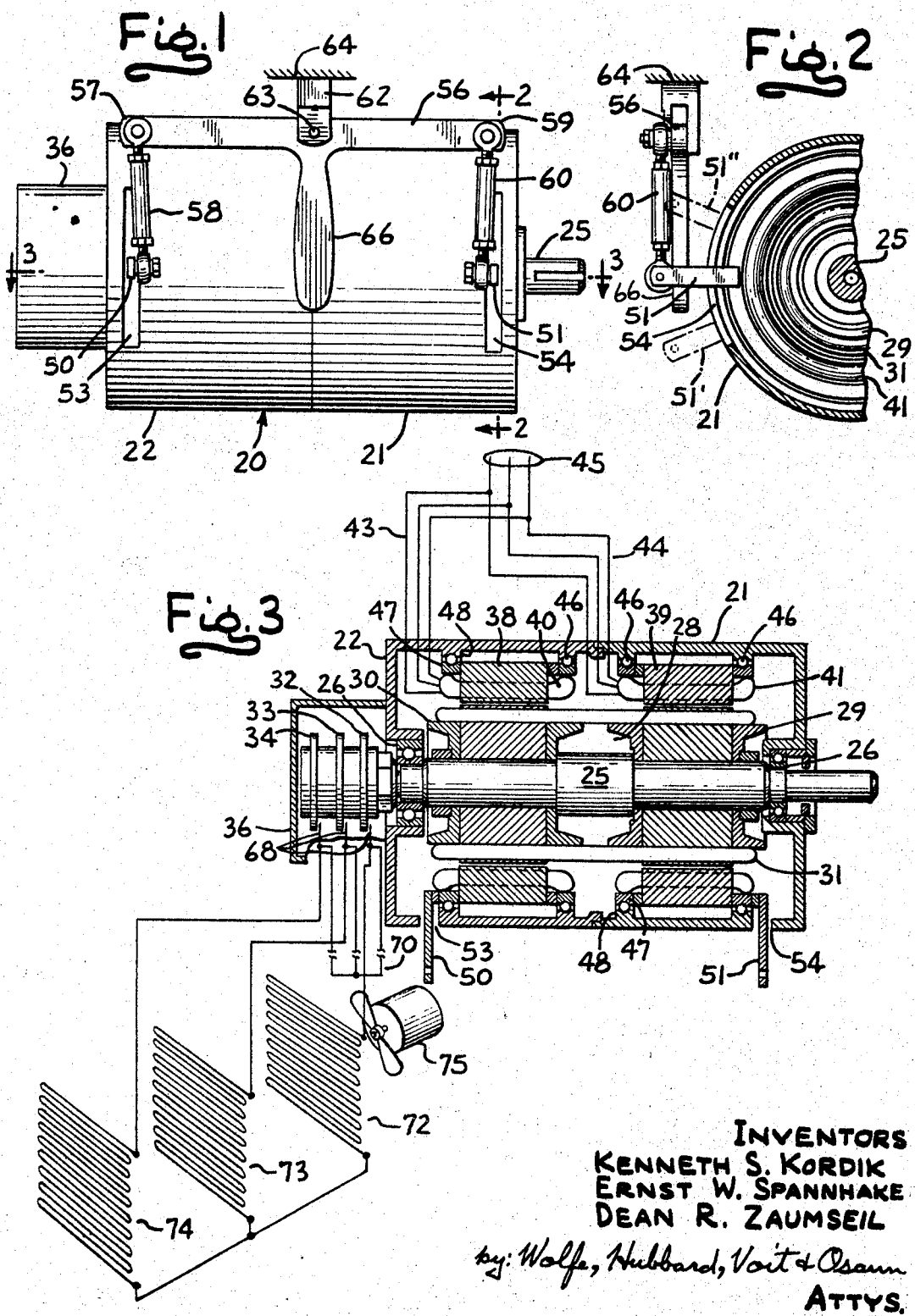

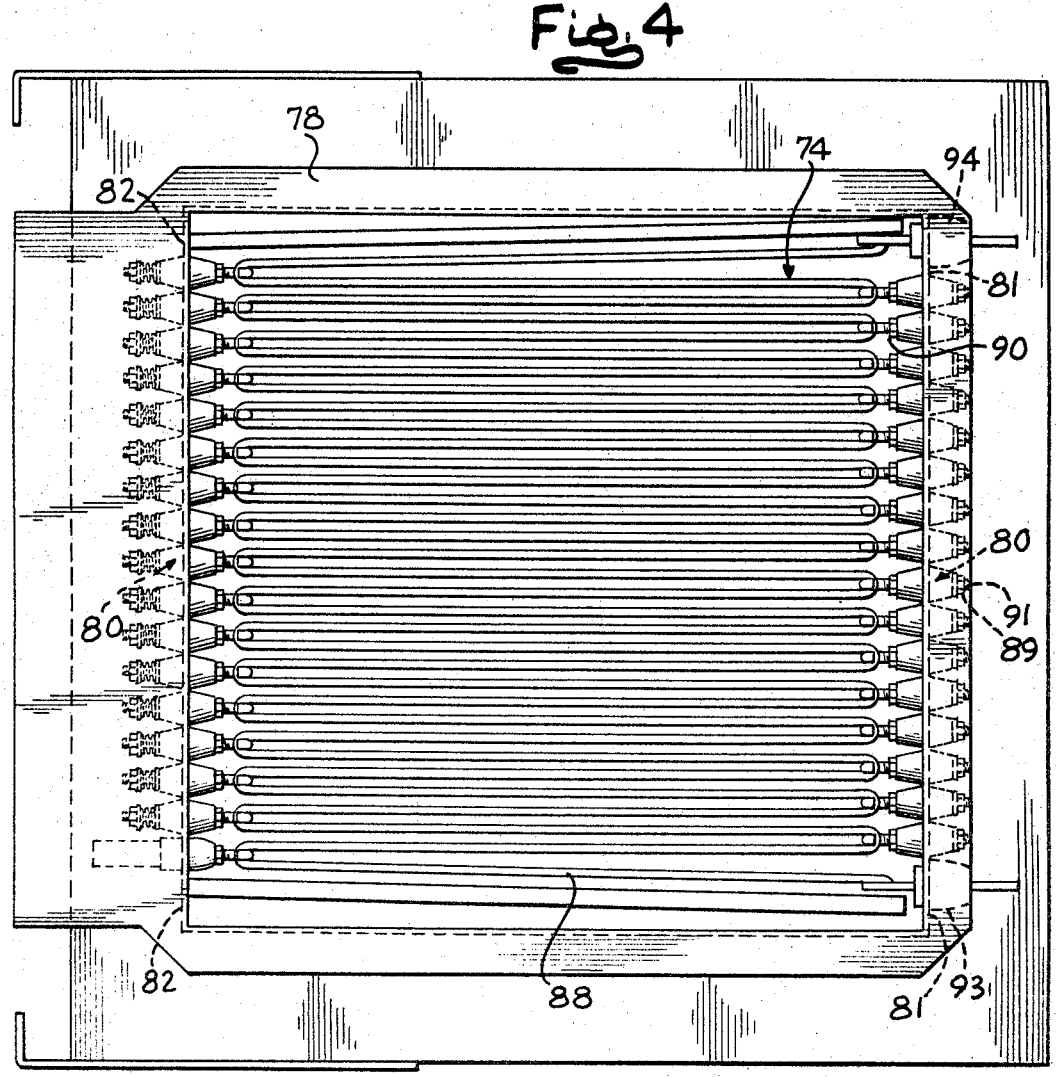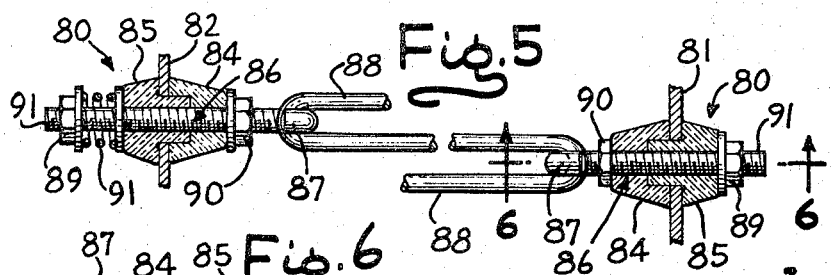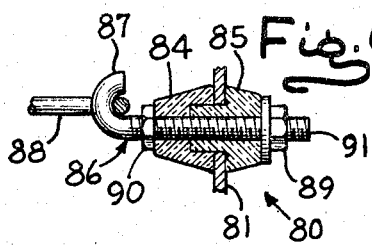

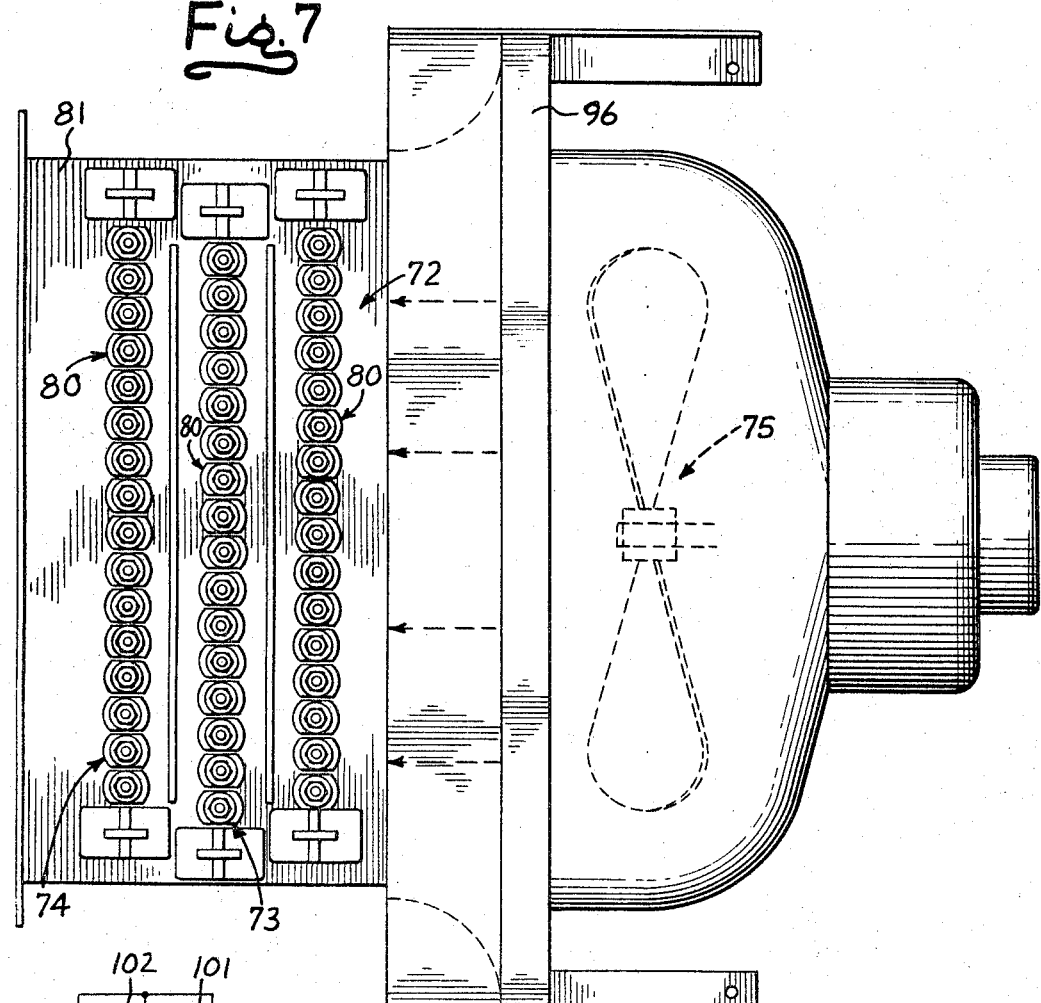
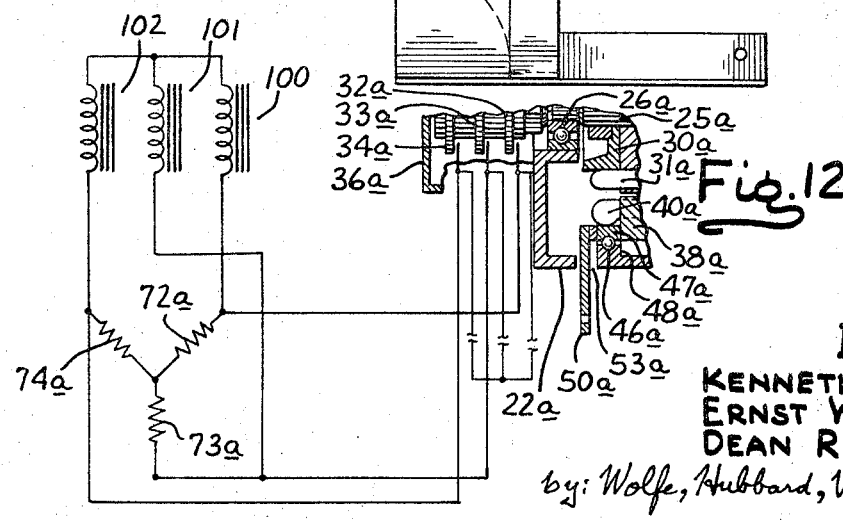
INVENTORS
KENNETH S. KORDIK
ERNST W. SPANNHAKE
DEAN R. ZAUMSEIL
by: Wolfe, Hubbard, Voit & Osann
ATTYS.

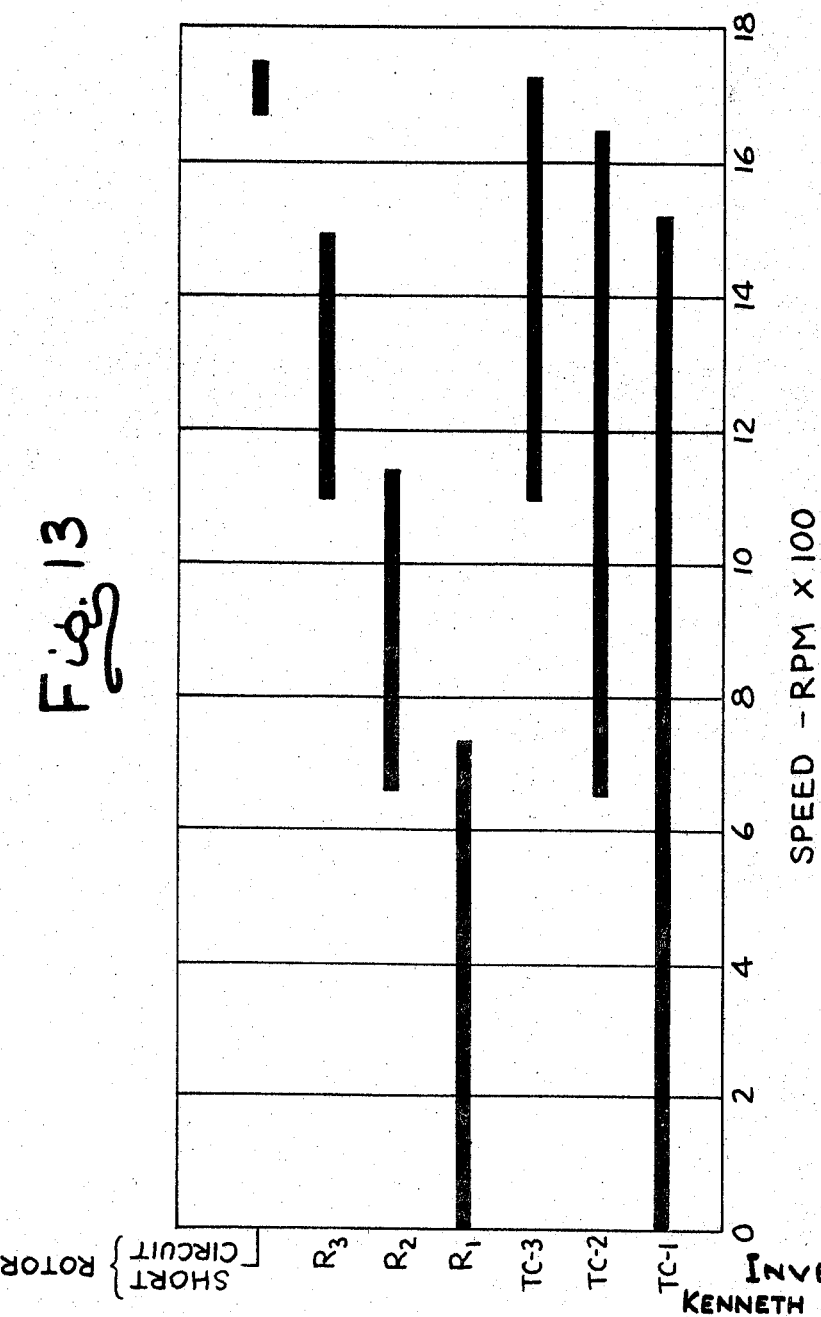

United States Patent Office 3,435,315
Patented Mar. 25, 1969

3,435,315
APPARATUS FOR CONTROL OF ADJUSTABLE SPEED A-C MOTORS
Kenneth S. Kordik, Ernst W. Shannhake, and Dean R. Zaumseil, Rockford, Ill., assignors, by mesne assignments, to Bucyrus-Erie Company, South Milwaukee, Wis., a corporation of Delaware
Filed June 16, 1966, Ser. No. 558,035
Int. Cl. H02p 1/26, 3/18, 7/40
U.S. Cl. 318—239
5 Claims The present invention relates generally to controlling the speed and torque of A-C motors and more particularly to improved methods and apparatus for controlling the speed-torque characteristics of induction motors of the type having flux linked primary and secondary windings. In its principal aspect, the invention is concerned with improved methods and apparatus for controlling the speed-torque characteristics of an adjustable stator type A-C motor which enables maintaining desired torques over a wide motor speed range yet which permits operation of the motor through a wider available range of speeds upon relative shifting of at least one stator with respect to the other.

Numerous different approaches have heretofore been utilized for electrical variation of A-C motor speed-torque characteristics. Since the speed of the rotor in an A-C motor may be expressed by the equation:

$$N_R = 120f(1-s)/P$$

where $N_R$ is the rotor speed, $f$ is the frequency, $s$ is the slip and $P$ is the number of poles, speed control may be accomplished by varying either of the parameters $f$, $s$, or $P$.

Changing the frequency has not been suitable from an economical standpoint and even then the speed range obtainable has been limited. Pole changing also introduces numerous complications which prevent practical application of more than two speeds and even then sacrifices as to desirable characteristics are made at both speeds. Simply changing slip by utilizing a wound rotor and introducing resistance into the rotor circuit for dissipating heat is also limited in application and under conditions of high "slip", considerable energy must be wasted in the form of heat in the rotor circuit.

One solution to the problem of controllably varying the speed of A-C motors which has been followed involves changing the induced voltage in the secondary circuit by providing separate interconnected stators which may be rocked relative to one another and which act upon a single wound rotor having external power dissipating resistors in the rotor circuit. In addition thereto, provision is made for switching of the number of poles, in both the stators and rotor, thus increasing the total available speed range obtainable for both pole arrangements. While this arrangement does constitute a substantial improvement over other known types of speed-torque control arrangements for A-C induction motors, certain disadvantages have been encountered, particularly when smooth continuous increase or decrease of speed is required over the entire variable range of motor speeds, due to the sudden jolting or discontinuity of operation encountered when switching occurs. Moreover, switch controls result in added costs and increased complexity to the system.

As a consequence, such variable speed controls have not provided a completely effective solution to the problem of continuously adjusting the speed of an induction motor.

Accordingly, it is a general aim of the present invention to provide improved methods and apparatus which overcome all of the foregoing disadvantages and which are characterized by their ability to produce a much wider available speed range for A-C motors accompanied by smooth variation in the speeds throughout the controlled range.

Another object of the present invention is to provide an improved adjustable speed induction type A-C motor which which employs a conductor in the circuit carrying the induced or secondary current having a relatively high temperature coefficient of resistance so that high current which exists in this circuit under high slip conditions brings about an increase in the effective resistance of this circuit and as the motor speed increases, with a decrease in slip the current is reduced thereby reducing the circuit resistance for more efficient running over a wider speed range.

It is an object of the invention in one of its aspects to provide an improved adjustable speed A-C motor employing a conductor in the secondary circuit having a relatively high temperature coefficient of resistance wherein the speed range may be even further increased by including means for "shorting out" the resistance in the high speed ranges thereby dissipating less energy for an even wider speed operating range. While not so limited in its application, the invention will find especially advantageous use in controlling the speed of an A-C motor of the adjustable stator type.

A further object of the present invention is the provision of improved methods and apparatus for increasing the range of speed control available with an A-C motor of the adjustable stator type characterized by smooth high torque starting characteristics with a much wider available speed range obtainable through shifting of the stators and without sacrificing efficiency of running under high speed, low slip, conditions.

Other objects and advantages of the invention will become apparent upon reference to the detailed description and attached drawings in which:

FIGURE 1 is an elevation view of an exemplary adjustable stator A-C motor embodying the features of the present invention;

FIG. 2 is a fragmentary, front end view, partially in section taken along the line 2—2 in FIG. 1;

FIG. 3 is a longitudinal section taken along the line 3—3 in FIG. 1 and including diagrammatically secondary resistances and coupling means in accordance with the present invention;

FIG. 4 is an elevation view of an exemplary resistance arrangement for use with the motor of FIG. 1;

FIG. 5 is a fragmentary section showing a supporting arrangement for stringing the resistance wire in the frame shown in FIG. 4;

FIG. 6 is a view taken along the line 6—6 in FIG. 5;

FIG. 7 is a top view of the resistance arrangement shown in FIG. 4;

FIG. 12 is a fragmentary schematic showing a slightly modified form of the present invention;

FIG. 13 is a graph comparing speed range obtainable with the resistances of the present invention as against speed ranges obtainable with ordinary resistances.

Figure 8:
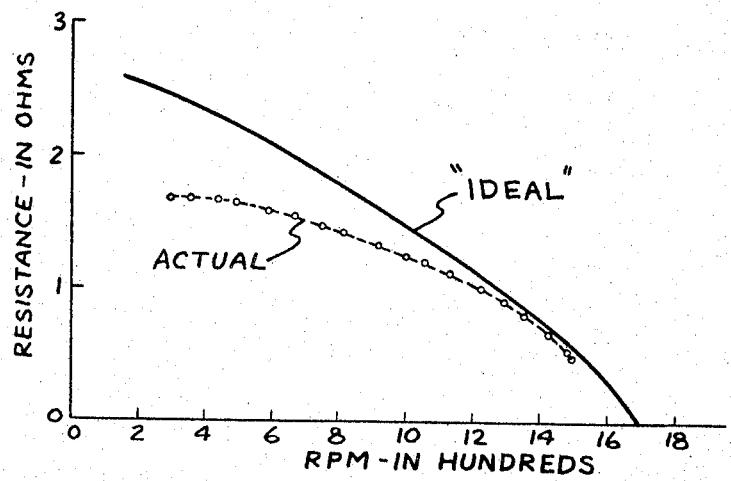
FIG. 8 is a graph showing "ideal" secondary resistance and actual secondary resistance for an exemplary motor plotted against motor speed.

While the invention has been susceptible of various modifications and alternative forms, specific embodiments thereof have been shown and described by way of example in the drawings and specification which will herein be described in detail. It should be understood, however, that it is not intended to limit the invention to the particular forms disclosed, but, on the contrary, the intention is to cover all modifications, equivalents, and alternatives falling within the spirit and scope of the invention as expressed in the appended claims.

Referring now to the drawings, particularly FIGS. 1–3, there is shown an exemplary motor 20 for use with the present invention having a frame which consists of a pair of cup-shaped members 21, 22 connected together to define a cylindrical housing. Extending axially through the housing is a rotor shaft 25 mounted in suitable bearings 26.

Secured to the shaft 25 is a rotor assembly, indicated generally at 28, which, in the present instance, includes two portions 29, 30. Engaging both portions of the rotor is a winding 31, which as shown in FIG. 3 is of the "wound" type having its leads brought out to slip rings 32–34, inclusive. A cup-shaped enclosure member 36 secured to the left hand housing member 22, as viewed in FIG. 1, is provided to enclose the slip rings.

Spaced side by side in the frame and aligned with the portions 29, 30 of the rotor are stator assemblies 38, 39, having windings 40, 41, respectively, with their respective leads 43, 44 being brought out to a three phase power source indicated at 45.

Referring to FIGS. 1 and 3, conjointly, the stator assemblies 38, 39 are, respectively, telescoped over the rotor portions 30, 29 so that the rotating magnetic fields generated by the stator assemblies induces current in their respective rotor portions, creating a secondary rotor field, with the interaction of the stator fields and the secondary rotor field producing the rotation and torque of the motor. Each of the stator assemblies is rockably supported within the housing 20, and are supported by suitable bearings, which in the present instance include balls 46 which ride in annular grooved members 47 secured to the stators and grooves 48 formed on the inside of the housing members 21, 22.

For the purpose of rotating the stator assemblies, there is provided a pair of arms 50, 51 connected to the stator assemblies 38, 39 respectively, and extending radially outwardly through slot 53, 54, provided in the motor housing 20. In the exemplary motor, herein described, the arms 50, 51 permit the application of rotational movement to the stators 38, 39 respectively, for positioning of the stators with respect to one another in order to adjust the electrical phase relation between the voltages induced by the stators in the rotor winding. That is, the stators may be oriented with respect to one another to produce a null phase position in which the voltages induced by the stators are opposite in phase and cancel one another so that the torque applied to the rotor is zero, the stators may be adjusted to a position in which the induced voltages are additive for the production of maximum torque, or the stators can be adjusted for any of an infinite number of resultant voltages between the maximum and null phase positions.

In the embodiment of the illustrative motor shown in FIGS. 1 and 3, there is provided a centrally pivoted lever 56 having a first end 57 which is connected to stator arm 50 via an eye-bolt connector member 58, and a second end 59 connected to the stator arm 51 via an eye-bolt connection member 60. The lever 56 is centrally pivoted about a link 62 by pin 63, and the link 62 is secured to a fixed surface 64 which may, for example, be a machine frame or the motor housing.

For the purpose of illustrating the operation of the motor, a manually controlled lever 66 is shown secured to the pivotal lever 56 by welding or the like, thus enabling the pivoted lever 56 to be tilted so that the stators are adjustably rotated with respect to one another to produce either a null condition in which the induced voltages are opposite in phase and cancel one another or a net induced voltage in the rotor winding for production of an output torque. It will be appreciated, however, as the discussion proceeds that while the motor has been described in connection with a particular simplified form of manual control linkage for operating dual rotatable stators, it will be understood by one skilled in the art that other specific arrangements mechanical, electrical, or fluid operated may be employed for rotating the stator and, if desired, one stator may be held fixed while the other stator, only, is made rotatable.

Turning to the rotor winding connections, since in the illustrative embodiment a wound rotor is utilized, the rotor winding passes through both portions of the rotor 29, 30 and the leads are brought out to corresponding slip rings 32 through 34 inclusive. The slip rings receive brushes 68 which as shown may be connected to an alternate short circuit contact arrangement 70.

In accordance with the present invention, resistances having a relatively high positive temperature coefficient are connected in the secondary or rotor circuit whereby high current flowing through the rotor circuit during starting heats the conductors to greatly increase the effective resistance of the rotor circuit and providing a smooth starting characteristic. As the motor speeds up and the slip decreases, with reduced current the rotor windings become cooler and the rotor resistance is capable of dropping off for efficient running under high speed, low slip, conditions. Consequently, the useful speed range available upon varying of the motor slip is greatly increased with automatic changing of resistance as required by the load and speed of the motor together with smooth and continuous control of the speed torque characteristics throughout the broader useful speed range which is obtained.

In carrying out the present invention, the resistances used are preferably ones having a relatively high positive temperature coefficient, i.e., resistances which exhibit a marked increase in resistance with increase in temperature particularly in the range of 70° F. (approximately room temperature) to about 1200° F. We have found that a resistance material formed of an alloy of 72% nickel-balance iron will give satisfactory results and exhibit a change of resistance of approximately 5 to 1 over a 70° F. to 1300° F. temperature range. With 72% nickel-balance iron resistances, an adjustable stator motor of the type described herein has been found to have useful speed ranges of from zero r.p.m. to 80% of synchronous speed, 30% to 90% of synchronous speed or 45% to 95% of synchronous speed depending upon the "cold" resistance of the wire.

The 72% nickel-balance iron resistance may be readily and inexpensively purchased in wire form, which we have effectively used having diameters of approximately 0.144 inch and approximately 0.162 inch with a respective resistance rating in ohms per foot at approximately 68° F. of 0.005788 and 0.004572. Other resistance materials which may be utilized in accordance with the present invention include but are not limited to iron and nickel.

Referring to FIG. 3, there is shown three banks or coils of such resistances, 72, 73, and 74 which are Y-connected to contact switches 69 associated with brushes 68. For the purpose of maintaining the mass of resistance material required within reasonable limits and to speed up the response time for changes of resistance with variation in temperature, fan cooling has been employed through fan 75.

In the embodiment of the invention illustrated in FIGS. 4 and 7, the coils of high temperature coefficient resistance material are arranged within a generally rectangular housing 78 to form rows of elongated sinuous coils vertically disposed within the housing, parallel to one another, so that air may be continuously blown across the coils with a maximum amount of coil surface area exposed to the flowing air. The center row 73 as shown in FIG. 7 is slightly offset with respect to the outer rows 72, 74 so that the air flow is directed into contact with a maximum of coil surface for effective cooling.

For the purpose of mounting the coils 73, 74 and 75 within the rectangular housing 78, there is provided a plurality of support members 80 disposed in aligned rows on opposite walls 81, 82 of the housing. Each of the support members 80 as viewed in FIGS. 5 and 6, conjointly, consists of inner and outer rigid insulating sleeves 84, 85, respectively, having an axial bore therethrough for receiving a hook bolt member 86. The bolt member 86 has a hooked end 87 so that the resistance wire 88 may be laced sinuously across the opposite rows of support members. Suitable nuts 89, 90 threadably engaging the threaded shank 91 of the bolt member 86 serve to tighten the insulator sleeves to the housing walls 81, 82 and enable the tension of the coils to be adjusted. In order to take up any slack in the wire that occurs due to expansion of the wire when it heats up, compression springs 92 are interposed between insulating sleeve 85 and retaining nut 90. The opposite ends of the individual coils are attached to terminals 93, 94 respectively which are connected to common junctions with adjacent coils and to contact switches 69 in Y-connection.

The rectangular housing containing the resistance coils is secured to a fan housing 96 with the coils being transversely oriented with respect to the path of air flow.

In order to more fully appreciate the results obtainable with the present adjustable speed motor control arrangement, there is shown in FIGURE 8, a graph of rotor resistance plotted versus motor speed comparing a 60 horse power adjustable stator motor of the type described herein with its "ideal" resistance curve compared with the resistance curve obtained utilizing high temperature coefficient material resistances in accordance with the present invention. The "ideal" resistance curve illustrates the rotor resistance required to operate the motor at the indicated speeds with a constant load of 225 pound-feet and the stators in the full power position. The "ideal" resistance curve for the 60 horsepower motor has been selected so that the 225 pound-foot load within the 0 to 3 ohm resistance range gives a rotor current in the proximity of 90 amperes which is the desired maximum constant current allowed in the rotor, yet enabling the resistance to provide some over torque capacity in order to accelerate the load or to handle some momentary overload. The resistances will take on a light glow that occurs when heated to within the 1300 to 1500° F. range. The actual curve for the high temperature coefficient resistances which are formed of the 0.144 inch diameter 72% nickel-balance iron wire rated at 0.005788 ohms per foot at 68° F. closely approaches the "ideal" curve as shown in FIG. 8. The actual resistance should never exceed the "ideal" as the motor will not have torque capacity to accelerate the load to a speed past the point where the curves cross. It can be seen that a very wide useful range of speed is obtainable, i.e., approximately 95% of synchronous speed.

Figure 9:
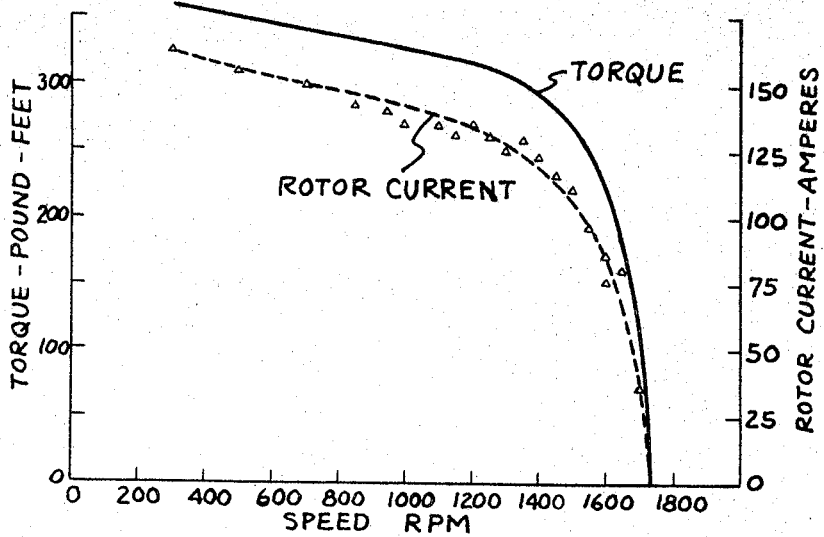
FIG. 9 is a graph showing secondary current and torque versus motor speed for an exemplary motor in accordance with the present invention.

Referring to FIG. 9, there is shown a graph of torque and rotor current versus speed for the 60 horsepower adjustable stator motor with the high temperature coefficient resistances in the rotor circuit. It can be seen from FIGURE 9 that the current is high when starting under high torque and as the torque and speed decrease, the rotor current is similarly reduced. It is also noted from FIGURE 8 that the resistance starts high and smoothly and continuously decreases as the speed increases. Thus, there is produced smooth speed-torque characteristics throughout the wise and useful speed range available with the present adjustable speed control arrangement.

Figure 10:
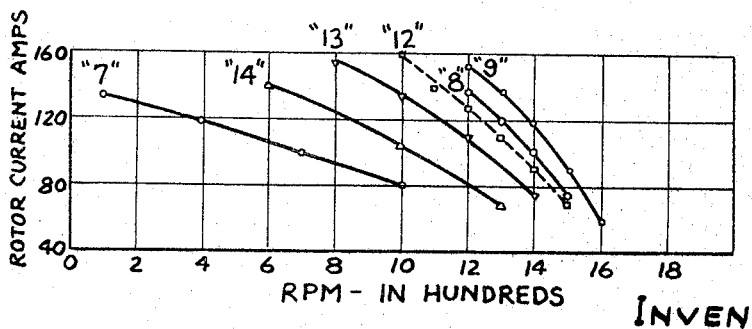
FIGS. 10 and 11 are graphs showing secondary current and torque respectively plotted against motor speed for a motor without the resistances of the present invention.
Figure 11:
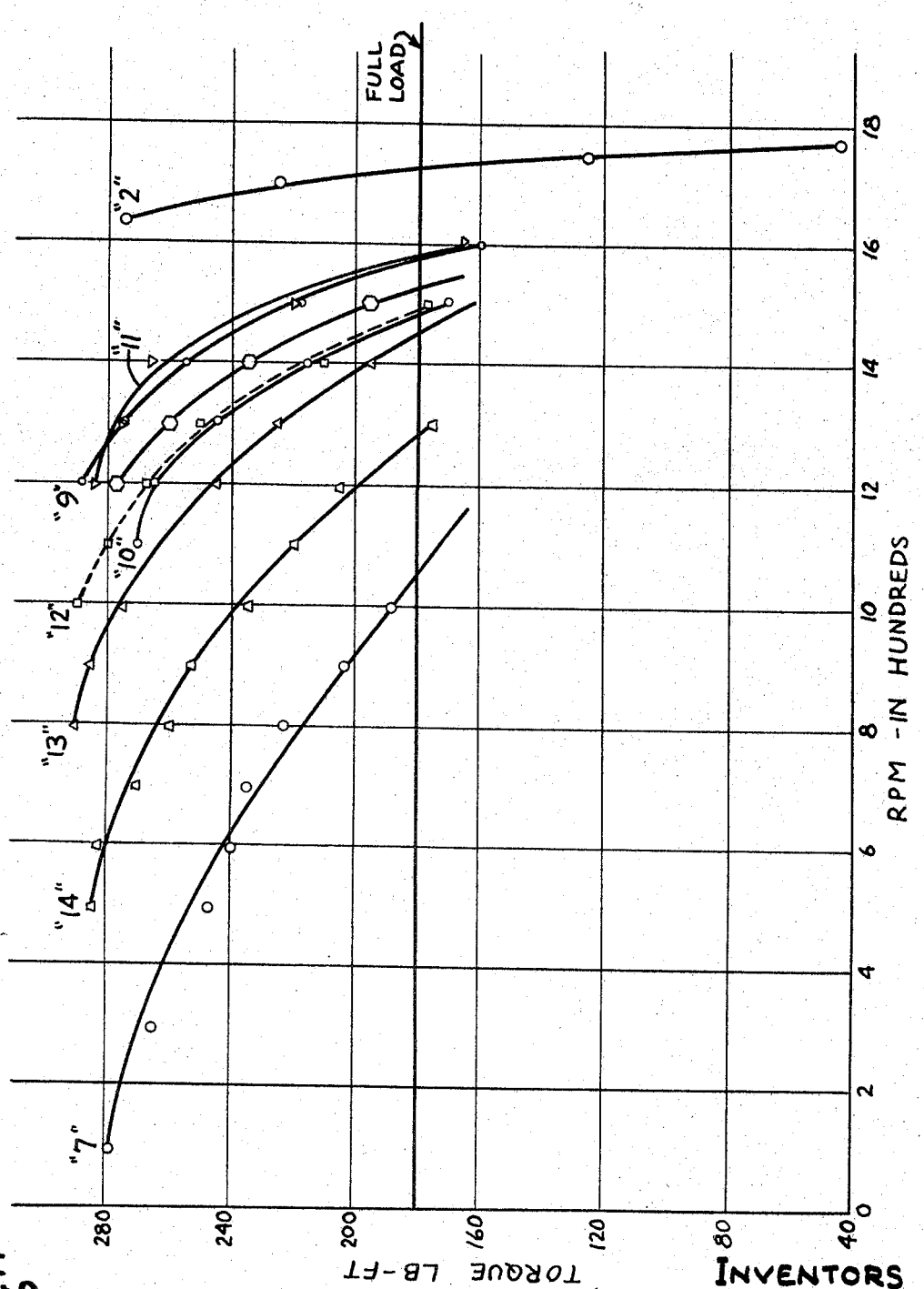

Referring to FIGURES 10 and 11, there is shown, respectively graphs of rotor current and torque versus motor speed wherein standard resistances in accordance with the following have been employed in the rotor circuit:

| Number: | Resistance |
|---|---|
| "2" | Short circuit |
| "7" | ohms__ 1.9 |
| "8" | do____ 0.68 |
| "9" | do____ 0.62 |
| "10" | do____ 0.7 |
| "11" | do____ 0.5 |
| "12" | do____ 0.75 |
| "13" | do____ 1.05 |
| "14" | do____ 1.35 |

It can be seen from FIGURES 10 and 11 that the available speed range for the adjustable stator motor using standard resistances is quite low, while the rotor current remains high so there is a great build up of heat in the rotor to the extent that it generally runs quite hot. At higher speed, near synchronous, the rotor current remains too high with the higher resistances, the fixed higher resistances are too high to allow operation under load towards synchronous speed, while at lower speeds the lower resistances do not produce enough slope in the speed torque curves to allow operation at these lower speeds. Thus, with the high resistances, the motor speed range is limited to high slip and the torque falls off at the upper speeds thus limiting the top speed obtainable. With low resistances there is overheating at starting conditions under load and considerable energy must be wasted in the form of heat in the rotor circuit, low speeds are unstable and starting torque is low.

While the exemplary form of the motor described herein is preferably of the "wound" type rather than the "squirrel cage" type, or any other type of induction motor, it will be appreciated that the use of high temperature coefficient of resistance material for speed control of an adjustable stator motor in accordance with the present invention is by no means limited to use with a wound rotor. However, the wound rotor does possess a number of advantages such as dissipation of the energy of slip in the form of heat safely outside the motor and enabling the use of cooling means for quickening the response time for changing the resistance as the motor is brought to high speed stator positions.

Moreover, the use of high temperature coefficient of resistance material in accordance with the present invention for controlling the speed of an A-C motor is not limited to mechanical phase changing of the induced voltages by shifting one or more rotatable stators. On the contrary, the present invention may be effectively utilized with adjustable speed A-C motors wherein static controls are used to electrically change the phase of the induced voltages. In a like manner the present invention is equally applicable wherein a wound rotor is used and the induced voltage is statically controlled on the rotor or the primary voltage is statically controlled on the stator to vary the motor speed.

Turning now to FIG. 12 there is shown a slightly modified motor speed control arrangement in accordance with the present invention utilizing high temperature coefficient resistances in the secondary or rotor circuit however, in this instance, additional means are interposed in the rotor circuit for "shunting" the resistances in the high speed range, thus increasing the efficiency under high speed conditions with less energy dissipated in the resistors. For convenience, the motor parts shown in FIG. 12 have been given corresponding numbers to those described previously with the addition of subscript "a."

In keeping with this form of the invention, reactors 100, 101 and 102 are connected in parallel with the external high temperature coefficient resistors 72a, 73a, 74a as shown in FIG. 12. Under starting conditions where the slip is very high, the frequency of the induced rotor current is also high and the reactors are effectively out of the circuit so that the high temperature coefficient resistors may effectively increase in resistance as previously discussed herein. As the motor speed is increased and slip decreases, the frequency of the induced rotor current also decreases and the impedance of the reactors drops with the combined impedance of the resistor-reactor circuit being less than it would be if the resistor were in the circuit alone. Consequently, under high speed, low slip conditions, the resistor is effectively "shorted out" resulting in a still further improvement in the speed range obtainable at or near synchronous speed and the efficiency under high speed conditions increases since there is less energy dissipated in the resistors.

Referring to FIG. 13, there is shown an illustrative graph comparing the speed ranges obtainable with an adjustable speed A-C motor having various fixed resistances $R_1$, $R_2$, and $R_3$ and speed ranges obtainable with the same motor using high temperature coefficient of resistance materials TC-1, TC-2, and TC-3 in the rotor circuit in accordance with the present invention.

Thus, as seen in FIG. 13 with fixed resistances $R_1$, $R_2$, and $R_3$ useful speed ranges, respectively, of approximately 0 to 40% of synchronous speed, 30% to 45% of synchronous speed or 45% to 80% of synchronous speed are obtainable. With a high temperature coefficient of resistance material TC-1 having a resistance at room temperature of approximately 0.5 ohm, a useful speed range of 0 r.p.m. to 80% of synchronous speed is obtained. For high temperature coefficient of resistance material TC-2 having a resistance of 0.25 ohm at 68° F. a useful speed range of 30% to 90% of synchronous is obtained and for a higher resistance TC-3, having a resistance of 0.12 ohm at 68° F., the useful range is 45% to 95% of synchronous speed.

It will be appreciated from the foregoing that the present invention will find particularly advantageous application in controlling the speed of A-C motors including mechanical or electrical arrangements for changing slip to vary the speed of the motor.

We claim:

1. Apparatus for controlling an adjustable speed A-C induction motor having a stator assembly with two substantially equal stator windings that are relatively adjustable with respect to one another to control the torque of said A-C induction motor from a null phase substantially zero torque condition to maximum torque condition, the combination comprising:
   a rotor rotatably mounted inside said stator assembly and having a plurality of conductors on it;
   a high positive temperature coefficient resistor connected in series with said conductors on said rotor to adapt the resistance in said rotor to each relative rotatable adjustment setting of said stator windings and to each load condition.

2. Apparatus for controlling an adjustable speed A-C induction motor as set forth in claim 1 wherein:
   said plurality of conductors on said rotor are windings;
   said high positive temperature coefficient resistor is mounted externally of said rotor.

3. Apparatus for controlling an adjustable speed A-C induction motor as set forth in claim 2 wherein:
   a fan is mounted to circulate cooling air over said high positive temperature coefficient resistor.

4. Apparatus for controlling an adjustable speed A-C induction motor as set forth in claim 3 wherein:
   said high positive temperature coefficient resistor includes an open frame housing and strips of high positive temperature coefficient resistor material suspended side by side across said open frame housing between support members in sides of said open frame housing;
   and said fan being mounted to circulate cooling air between said trips of high positive temperature coefficient resistor material.

5. Apparatus for controlling an adjustable speed A-C induction motor as set forth in claim 4 wherein:
   at least some of said support members have spring means to take up expansion slack occurring in said strips of high positive temperature coefficient resistor material.

References Cited

UNITED STATES PATENTS

| | | | |
|---|---|---|---|
| 1,127,263 | 2/1915 | Kallmann | 318—239 XR |
| 1,626,622 | 3/1927 | Moeller | 318—240 |
| 3,082,364 | 3/1963 | Fischer et al. | 318—239 XR |
| 3,290,574 | 12/1966 | Roe | 318—238 XR |

ORIS L. RADER, *Primary Examiner.*

G. Z. RUBINSON, *Assistant Examiner.*

U.S. Cl. X.R.
318—243